United States Patent [19]

Jabsen

[11] 4,152,206

[45] May 1, 1979

[54] NUCLEAR FUEL ELEMENT END FITTING

[75] Inventor: Felix S. Jabsen, Lynchburg, Va.

[73] Assignee: The Babcock & Wilcox Company, New York, N.Y.

[21] Appl. No.: 803,496

[22] Filed: Jun. 6, 1977

[51] Int. Cl.² .................................... G21C 3/34
[52] U.S. Cl. ............................. 176/78; 176/76
[58] Field of Search ..................... 176/76, 78, 79

[56] References Cited

U.S. PATENT DOCUMENTS

| 3,167,484 | 1/1965 | Beutel | 176/78 |
| 3,350,276 | 10/1967 | Warberg | 176/78 |
| 3,354,045 | 11/1967 | Macfall | 176/78 |
| 3,862,884 | 1/1975 | Jabsen | 176/78 |

Primary Examiner—Samuel W. Engle
Assistant Examiner—Donald P. Walsh
Attorney, Agent, or Firm—J. M. Maguire; J. P. Sinnott

[57] ABSTRACT

A typical embodiment of the invention has an array of sockets that are welded to the intersections of the plates that form the upper and lower end fittings of a nuclear reactor fuel element. The sockets, which are generally cylindrical in shape, are oriented in directions that enable the longitudinal axes of the sockets to align with the longitudinal axes of the fuel rods that are received in the respective sockets. Detents impressed in the surfaces of the sockets engage mating grooves that are formed in the ends of the fuel rods to provide for the structural integrity of the fuel element.

1 Claim, 2 Drawing Figures

U.S. Patent May 1, 1979 4,152,206
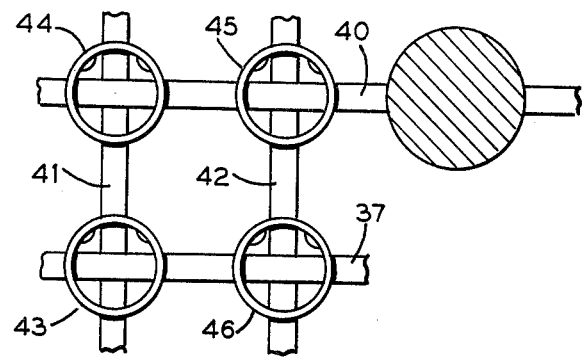
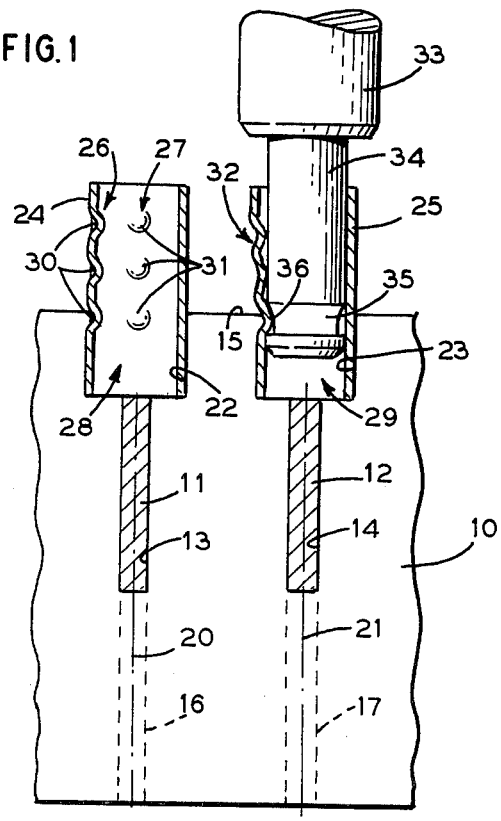

NUCLEAR FUEL ELEMENT END FITTING

BACKGROUND OF THE INVENTION

1. Field of the Invention

This invention relates to fuel elements for nuclear reactors and, more particularly to fuel element end fittings that engage the ends of the fuel rods, and the like.

2. Description of the Prior Art

To produce useful power from a nuclear reactor, it is customary to load a suitable concentration of fissionable uranium in a group of hollow rods. This group of loaded rods, frequently referred to as the reactor core, transfers the heat that is generated through the fission processes in the uranium to water that is flowing through the core.

The group of rods that form the reactor core ordinarily are arranged in units that are called fuel elements. This sub-grouping of the fuel rods into fuel elements tends to enhance the structural integrity of the reactor core and simplify the tasks of initially loading the reactor core with fissionable fuel, rearranging partially used fuel within the core to obtain maximum fuel utilization and removal of the fuel for inspection, repair and replacement, as necessary.

In the reactor core, the fuel rods are exposed to a hostile environment that not only includes intense radiation, high temperature and fission product generation, but also includes the mechanical stresses and potential vibrations that are imposed by the water flowing through the core. To stabilize the individual fuel rods within the respective fuel elements, expensive and elaborate end grid and end fitting structures have been devised to enable the fuel rods to be essentially clamped between the end fittings. The end grids, moreover, are not entirely satisfactory because the contact between the fuel rod and the grid tends to produce a type of erosion in the fuel rod surface that is known as "fretting". Further in this respect, the end grid and end fitting structures that have characterized the prior art also tend to decrease the water pressure as it flows through the reactor core.

To control the power generated within the reactor core, control rods are inserted into the core to regulate the intensity of the fission processes. Frequently, the control rods are received in tubes that guide the rods as they are moved into or out of the reactor core. In addition to guiding the motion of the control rods in the reactor core, these guide tubes often serve the additional function of joining the opposite end fittings together in order to clamp the fuel rods between the end fittings. To enable the guide tubes to carry out this function of clamping the fuel rods in their proper spatial relation, the ends of the guide tubes are fitted with special sleeves and nuts. This arrangement not only is expensive, requiring a large number of specially produced and carefully machined parts, but also increases the time required for fabrication and assembly.

Clearly, there is a need for a fuel element end fitting that overcomes the inadequacies that have characterized the prior art.

BRIEF DESCRIPTION OF THE INVENTION

To a great extent, the foregoing difficulties are overcome, or at least alleviated through the practice of the invention. More specifically, end fittings are formed from lattices of mutually perpendicular plates. At the plate intersections, sockets are secured to the end fittings in a manner that permits the longitudinal axes of each of the sockets to align with the respective lines of intersection of the plates. The sockets, moreover, all protrude above one of the surfaces of the end fitting. Further in accordance with a particular feature of the invention, a detent is formed in the protruding sides of each of the sockets.

Annular grooves are formed in each of the ends of the fuel rods that are to be mounted between the end fittings. The socket detents protrude into the respective annular grooves, thus engaging the grooves and retaining the fuel rods and end fittings in one integral structure.

In this way, the usual two end spacer grids that heretofore have characterized fuel element design are eliminated and, with the elimination of these grids, the cause of fretting erosion in the end portions of the fuel rods also is removed. Through the further elimination of elaborate cast end fittings, a source of hydraulic pressure loss is avoided and fuel element costs are reduced.

If a fuel element having a detent arrangement of the type that illustrates principles of the invention must be removed from the reactor core, each individual fuel rod and socket detent combination need only support the weight of the respective fuel rod and the proportionate share of the weight of the opposite end fitting grid and socket array.

Naturally, fuel element support grids and socket arrangements of the type that characterize the invention further overcome the need for load-bearing control rod guide tubes and the expensive special fittings that these tubes required in order to clamp the fuel rods between the opposing end fittings.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

FIG. 1 is a front elevation in full section of a portion of a fuel element end fitting that embodies features of the invention; and FIG. 2 is a plan view of an embodiment of the invention.

DETAILED DESCRIPTION

As shown in FIG. 1 an end fitting grid plate 10 meshes with a parallel pair of end fitting grid plates 11, 12. As shown in the drawing, the grid plate 10 has a pair of parallel slots 13, 14 that extend from transverse edge 15 of the plate 10 through about half the width of the plate. The slots 13, 14, moreover, are just slightly wider than the thicknesses of the respective grid plates 11, 12 that are nested within these slots. Thus, as shown in FIG. 1 the grid plates 11, 12 are perpendicular to and mesh with the plate 10.

The grid plates 11, 12 also have widths that are essentially equal to the width of the plate 10. The plates 11, 12 also are provided with mating slots, as shown by means of broken lines 16, 17 which illustrate the continuation of these plates in a direction that is perpendicular to the plate 10 beyond the plane of FIG. 1.

Further in this respect, the meshed grid plates 10, 11 and 10, 12 each form mutual intersection lines 20, 21 respectively. Further recesses 22, 23 are formed at the intersections of the grid plates 10, 11 and 10, 12, respectively to extend below the transverse edge 15 of the grid plate 10. The widthwise edges of the recesses 22, 23 also are equidistantly spaced from the respective mutual intersection lines 20, 21 as indicated in the drawing. In this way, the recesses 22, 23 that are formed in the grid plates 10, 11, 12 all combine to form wells 28, 29.

Hollow, generally cylindrical sockets 24, 25 are received in respective recesses 22, 23. The outside diameters of the sockets 24, 25 are sufficient to provide a snug fit in the respective recesses. With respect to the length of the sockets 24, 25, however, in the illustrative embodiment of the invention shown in the drawing, the sockets protrude well above the transverse edge 15 of the grid plate 10, the protrusion above the edge 15 in the direction of the intersection lines 20, 21, the extension above the edge 15 being slightly greater than the depths of the recesses 22, 23 that receive the respective sockets 24, 25.

In accordance with a feature of the invention, two separate sets 26, 27 of three detents 30, 31 each are pressed into the surface of the socket 24. As illustrated, the detents 30, 31 in the sets 26, 27, respectively are arranged in general parallel alignment with the mutual intersection line 20. These detents, moreover, protrude inwardly into the hollow center of the socket 24. Similar sets of detents, of which only detent set 32 is shown in FIG. 1 of the drawing, also are formed in the socket 25.

For illustrative purposes, an end portion of a long, slender and generally cylindrical fuel rod 33 is shown in its engaged position within the socket 25. The terminal portion of the fuel rod 33 has a substantially cylindrical plug 34 with an outside diameter that is appreciably smaller than the general outside diameter of the main portion of the fuel rod 33. As shown, the plug 34 has a length that is slightly greater than the length of the cylindrical axis of the socket 25.

Further in accordance with the invention, the extreme end portion of the plug 34 that is received within the socket 25 is provided with an annular groove 35 that matches the radially inward extension of the individual detents in the detent set 32. Thus, a detent 36 in the detent set 32, and a detent in a set in the socket 25 that is out of the plane of the drawing that corresponds, however, to the detent set 27 in the socket 24 also engages the groove 35.

The combination of detents and the groove in the end portion of the fuel rod 33 is sufficient to keep the rod mounted in its respective socket.

Although it is not shown in the drawing, an equivalent end fitting grid structure engages the opposite end of the fuel rod 33.

In accordance with the invention, each fuel rod in the fuel assembly is engaged at its extremeties by means of individual sets of sockets in the manner described with respect to the socket 25 and the fuel rod 33. Consequently, each fuel rod (in a fuel assembly that might accommodate two hundred or more of these rods) need sustain only its own weight and the proportionate share of the weight of the associated grid structures that are used to enhance the structural integrity of the fuel assembly. Thus, the individual detent and groove construction described herein is sufficiently strong to permit the fuel assembly to be handled as a single unit during reactor core loading, spent fuel removal, and the like.

In operation, an array of grid plates 37, 40, 41, 42 as shown in FIG. 2 are meshed together to form the rectangular end fitting cell structure that is shown in FIG. 2. Through welding, brazing or other suitable means the meshed grid plates are secured together to form the preferred cellular structure. Hollow annular sockets 43, 44, 45, 46 are seated in respective recesses formed at the mutual intersections of the grid plates 37, 40, 41, 42 and, as illustrated in FIG. 2, and are welded, brazed or otherwise secured to the grid structure.

Fuel rod ends of the type shown in FIG. 1 are aligned each with one of the respective sockets 43, 44, 45, 46 and pressed into the sockets with sufficient force and to a sufficient depth within the individual sockets to establish engagement between detents and grooves in the manner that is shown in FIG. 1 with respect to the detent 36 and the groove 35.

The grid structures that sustain the mid-portion of the fuel rods in the assembly are positioned on these rods. A typical structure of this character is described in more complete detail in F. S. Jabsen U.S. Pat. No. 3,665,586 granted May 30, 1972 for "Nuclear fuel rod supporting arrangements".

The remaining unsecured ends of the array of fuel rods in the fuel assembly are pressed into another end fitting grid structure (not shown in the drawing). This final end fitting is, in its essential parts that relate to engaging the fuel rod ends essentially as shown in FIGS. 1 and 2. Because the detent-groove combination in each fuel rod and associated pair of sockets need sustain only a small portion of the overall weight of the fuel assembly, this connection provides adequate strength for raising a complete fuel assembly from a transportation container and positioning the assembly within a reactor core. The strength provided by these connections, moreover, is sufficient to preserve the structural integrity of the fuel assembly against earth tremors, hydraulic forces and the like, while permitting a used or partially used fuel assembly to be lifted out of the reactor core for inspection or replacement.

Naturally, the detent and groove structure described herein also is suitable for application to control rod guide tubes and other fuel assembly structures with equal advantage.

The embodiments of the invention in which an exclusive property or privilege is claimed are defined as follows:

1. An end fitting grid structure comprising a first plurality of generally parallel plates, said plates having transverse edges and slots formed in said plates that are generally perpendicular to said respective transverse edges, recesses formed in said plates and communicating with said slots, said recesses being formed between said transverse edges and said slots, another plurality of generally parallel plates perpendicular to and having slots formed therein to mesh with said first plurality of plates along lines of mutual intersection in order to form a generally cellular structure, said another plurality of plates also having recesses formed therein spaced from and in general alignment with said meshing slots to combine with said first plate plurality recesses to form wells in the cellular array of plates at said mutual intersection lines, a plurality of hollow sockets each received in a respective one of said wells, and detent means formed therein to protrude inwardly of said respective socket, said sockets protruding above said transverse edges and said detent means having at least two sets each of three detents, said detents in said respective sets being aligned in a row that is generally parallel with said respective one of said lines of mutual intersection.

* * * * *